Sept. 12, 1961  J. ISREELI  2,999,417
COLORIMETER
Filed June 5, 1957  2 Sheets-Sheet 1
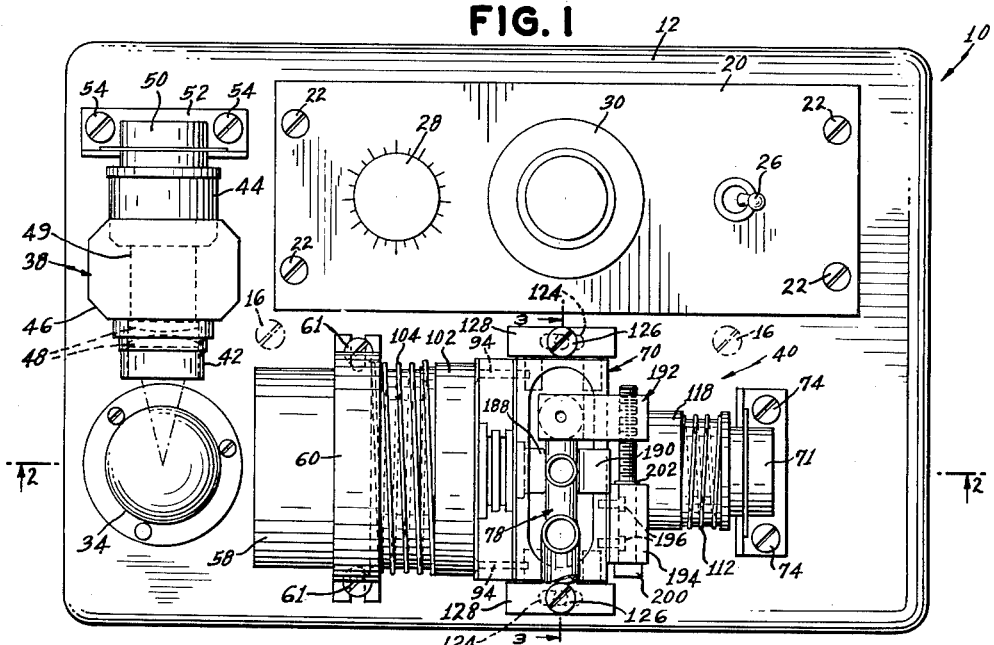
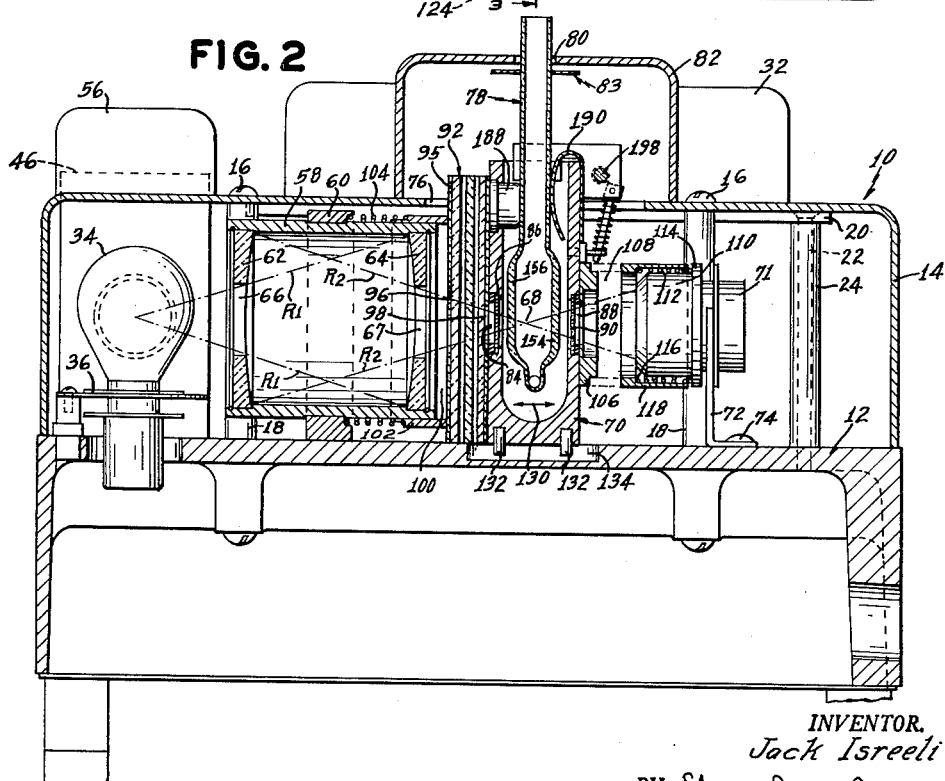
INVENTOR.
Jack Isreeli
BY
ATTORNEYS Sept. 12, 1961 J. ISREELI 2,999,417
COLORIMETER
Filed June 5, 1957 2 Sheets-Sheet 2

INVENTOR.
Jack Isreeli
BY Edwin Levison
Harry Cohn
ATTORNEYS

United States Patent Office 2,999,417
Patented Sept. 12, 1961

2,999,417
COLORIMETER
Jack Isreeli, Tuckahoe, N.Y., assignor, by mesne assignments, to Technicon Instruments Corporation, Chauncey, N.Y., a corporation of New York
Filed June 5, 1957, Ser. No. 663,681
14 Claims. (Cl. 88—14)

The present invention relates, in general, to colorimeters and, in particular, to a light exposure device or flow cell for the photoelectric viewing of a stream of liquid samples or the like.

An object of the present invention is the provision of a light exposure flow cell for a colorimeter which cell provides for an increased absorption of the light by a sample fluid therein.

Another object is the provision of a flow cell which is so formed that a minimum amount of sample liquid can be utilized to provide a relatively long light path therethrough.

Another object is the provision of a holder for a flow cell wherein provision is made for the ready removal and replacement of the flow cell, as may be required for inspection, cleaning, etc.

Another object is to provide a cell holder which is adjustable in a direction to focus the light on a predetermined portion of the cell.

Another object is the provision of a cell holder having a readily removable flow cell therein, which holder need not be readjusted upon removal and replacement of a flow cell therein.

A further object is to provide for the adjustment of the flow cell within the holder to accurately position the light viewing part of the flow cell in the light path through the holder.

The above and other objects, features and advantages of the present invention will be more fully understood from the following description considered in connection with the accompanying illustrative drawings.

In the drawings which illustrate the best mode presently contemplated of carrying out the invention;

FIG. 1 is a top plan view of a colorimeter pursuant to the present invention, with parts thereof removed for purposes of illustration;

FIG. 2 is a sectional view taken on the line 2—2 of FIG. 1, including the removed parts;

Figure 4:
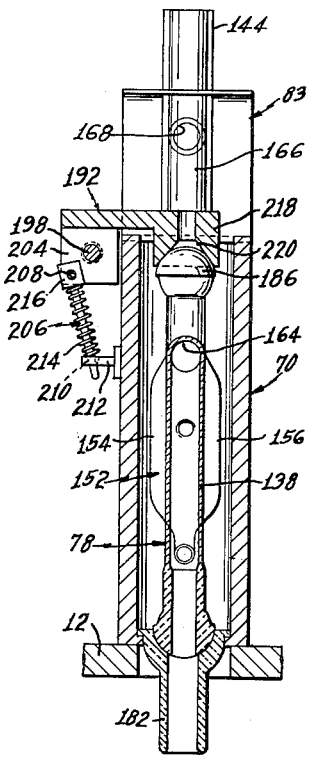
FIG. 4 is a sectional view taken on the line 4—4 of FIG. 3.

Referring now to FIGURES 1 through 7 of the drawings in detail, there is shown presently preferred embodiment of a colorimeter 10 pursuant to the present invention. The colorimeter 10 is of a type which is especially well adapted to provide a continuous colorimetric analysis or evaluation of a liquid flow or a stream of successive liquid samples. In this connection, the colorimeter 10 is especially useful in connection with an apparatus for automatically analyzing fluid, such as that illustrated and described in the copending application of Leonard T. Skeggs, Ser. No. 330,211, filed January 8, 1953, and assigned, to the assignee hereof, now Patent No. 2,797,149. However, it will be understood that the colorimeter of the present invention is not limited to use with a fluid analyzing apparatus and, further, it is within the scope of the present invention to use the colorimeter 10 in connection with any type of liquid which is suitable for colorimetric examination.

As here shown, the colorimeter is provided with a base or casting 12 formed of a suitable metal and on which the various components of the colorimeter are mounted. A housing 14 is removably secured on the base 12 by means of the securing elements 16 which are threaded into sleeves 18 provided on the base 12. Various components of the colorimeter are enclosed within the housing 14, as hereinafter described in detail. A plate 20 is suitably secured in position, upwardly of the base 12, by securing elements 22 which extend through spacers or sleeves 24 for engagement with the base. It will be understood that the plate 20 is accessible through the housing 14 and constitutes a control panel for a power switch 26 and manual controls 28 and 30. A removable cover 32 is provided on the plate 20 for obtaining access to the control panel.

An electric light source 34 is suitably mounted on the base 12, by means of a bracket or holder 36 and provides a source of light both for a standard or reference assembly, generally indicated by the reference numeral 38 and for a sample assembly, generally indicated by the reference numeral 40, it being noted that said assemblies at 38 and 40 are disposed at right angles to each other. The reference assembly 38 is constituted by a suitable filter housing 46 provided with a light inlet tube 42. The light inlet tube is provided with suitable lenses 48 to form a beam of light 49 passing through the filter housing 46 to energize a photoelectric device 44, connected to a plug-in socket 50 suitably mounted by a bracket 52 secured to the base 12, as at 54. The filter housing 46 extends through a suitable opening provided in the top of the cover housing 14, for access thereto and a separate removable cover 56 is provided on the housing 14 for said filter housing.

The sample assembly 40 includes a light-tight cylindrical member 58 which is horizontally mounted in an annular mounting member 60, the latter being suitably secured to the base as by the securing elements 61. Concave mirrors 62 and 64 are mounted in confronting relation at the opposite ends of the cylinder 58, closing said opposite ends, said mirrors being preferably of the type wherein the mirrored surface is constituted by the front surface thereof. Mirror 62 is provided with a central aperture 66 and mirror 64 has a similar aperture 67. As best seen in FIG. 2, light from the source 34 enters through the opening in the mirror 62 and strikes the concave reflecting surface of the mirror 64, as indicated by the light rays R1 which are then reflected by the mirror 64 onto the concave mirrored surface of the mirror 62. The latter focuses the light, as indicated by the rays R2, to pass through the opening 67 in mirror 64, and to focus at the focal point 68.

The focal point 68 is located within a flow cell holder 70 which is mounted between the light outlet aperture 67 and a photoelectric device 110 connected to a plug-in socket 71, carried by a bracket 72 suitably secured to the base 12, as by the securing elements 74. It will be noted that the cell holder 70 extends upwardly from the base 12 through an opening 76 provided in the housing 14 and mounts a flow cell or a viewing cell 78 which extends through openings 80 and 81 provided in a removable cover 82 for the opening 76. A light baffle 83 is removably positioned on cell 78 to prevent the transmission of any strong light from openings 80 and 81 to cell holder 70.

The cell holder 70 is provided with a light inlet opening 84 at one side thereof, which is backed by a transparent window 86. The cell holder has a light outlet opening 88 at the opposite side thereof, backed by a transparent window 90. At the light inlet side thereof, the cell holder mounts a filter assembly 92 which is suitably secured thereto, as by the securing elements 94. The filter 92 is mounted in a holder or casing 95 having a light inlet opening 96 and an opposing light outlet opening 98, the latter being in registry with the light inlet opening 84 of the cell holder 70. The light inlet opening 96 of the filter holder 95 is in registry with the light outlet aperture 67 of the cylinder 58, and it will be noted that said openings 67 and 96 are laterally spaced from each other, as by the spacing 100. It will be noted that the spacing 100 underlies the opening 76 in the housing 14. A light shield, in the form of a sleeve 102, is slidably mounted on the periphery of the cylinder 58, and a compression spring 104 is seated on the periphery of cylinder 58 between the cylinder holder 60 and the sleeve 102. The spring 104 normally biases the sleeve 102 against the filter holder 95 so as to form a light-tight enclosure about the space 100 between the cylinder and the filter holder. However, in order to observe the transmission of the light rays R2 through the outlet aperture 67 of the cylinder into the inlet aperture 96 of the filter holder, the cover 82 may be readily removed and the sleeve 102 may then be retracted against the bias of the spring 104.

The light rays R2 focus at the point 68 and leave the cell holder 70 through the outlet aperture 88 thereof, passing through an annular member 106 mounted at the light outlet side of the cell 70 in registry with the outlet opening 88 thereof. The member 106 is in registry with and laterally spaced, as at 108, from the photoelectric device 110. A compression spring 112 is seated between a shoulder 114 of the device 110 and a shoulder 116 of a slidable light shield or sleeve 118. It will be noted that the space 108 underlies the opening 76 in the housing 14 and that said space is normally closed by the sleeve 118 which is normally biased by the spring 112 against the apertured member 106, as best shown in FIG. 1, to provide a light-tight path along which the light rays travel from the cell holder to the photoelectric device 110. However, when it is desired to observe the passage of the light rays at the outlet of the cell holder 70, the cover 82 may be removed and the sleeve 118 urged to the retracted position thereof illustrated in FIG. 2 against the bias of the compression spring 112.

Figure 3:
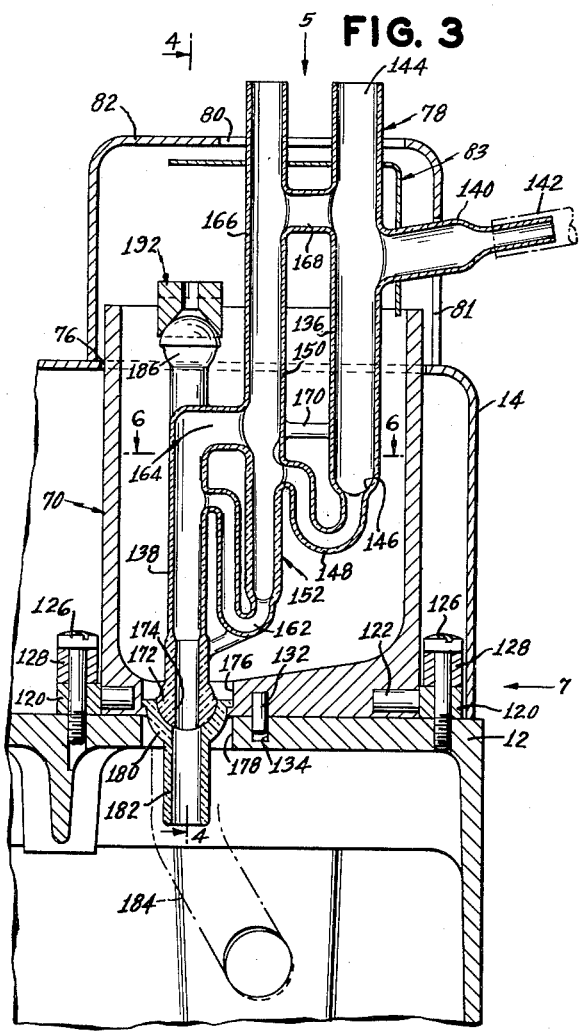
FIG. 3 is a sectional view on an enlarged scale, taken on the line 3—3 of FIG. 1.
Figure 7:
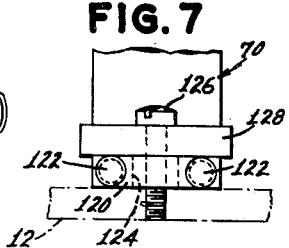
FIG. 7 is a detail view taken in the direction of the arrow 7 in FIG. 3.

The cell holder 70 is mounted for lateral reciprocation relative to the outlet aperture 67 of the cylinder 58 in order to assure that the flow cell 78 will be at the focal point 68, as hereinafter described in detail. In order to effect the lateral adjustment of the cell holder 70 relative to the outlet aperture 67 of the cylinder 58, provision is made at each of the opposite sides of the cell 70 for a block 120 which is secured to the adjacent side of the cell by a pair of headed pins 122 which are engaged in the adjacent side of the cell holder, as best shown in FIGS. 3 and 7. The block 120 has an elongated slot 124 defined therein and a bolt 126 extends through the slot 124 and is threaded into the base 12. A spacer 128 is interposed between the head of the bolt and the block 120, the bolt extending through the spacer.

In order to effect a limited lateral adjustment of the cell holder 70, in the direction of the arrowheads 130 (FIG. 2) so as to focus the rays R2 at a predetermined point within the cell holder, the bolts 126 are partially retracted so as to permit the movement of the cell holder to the desired position thereof, said movement being observed when the cover 82 is removed so that the focusing of the light rays R2 at point 68 is visible, as hereinafter described. Provision is made to guide the cell holder during said lateral adjustment thereof. In this connection, the cell holder is provided with a pair of aligned depending pins 132—132 which extend into a guide slot or recess 134 provided in the base 12. By reference to FIGURE 3, it will be noted that the width of the guide recess 134 is substantially the same as the diameter of the pins 132.

The previously identified flow cell 78 is mounted within the cell holder 70. The flow cell 78 is preferably made of glass and has an input arm 136 and an output arm 138. The input arm is provided with a lateral nipple 140 which is adapted to receive one end of a sample input tube 142 through which the liquid stream containing the samples to be analyzed are fed to the input arm 136. As explained in the previously identified application, air is introduced into the analyzing apparatus with the various samples and processing media introduced therein so that the output of said analyzing apparatus, which is to be subjected to colorimetric examination, contains for each sample input a plurality of liquid segments which are separated by air segments. Consequently, the arm 136 is of a relatively large diameter so as to eliminate the air bubbles or segments between the various liquid segments, the air being released from the flow cell 78 through the upper open end portion 144 of arm 136, above the nipple 140, said upper portion serving as a vent for the arm 136 and extending, through the opening 80 in the associated cover 82, to the outside atmosphere.

Figure 6:
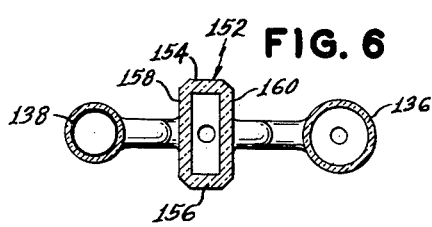
FIG. 6 is a sectional view on the line 6—6 of FIG. 3.

At the bottom thereof, the input arm 136 tapers gradually, as at 146, into the narrowed U-shaped or reflexed neck 148. Due to the gradual taper 146, and the reflexed neck 148, the various segments of the same sample, which now are no longer separated by air bubbles or air segments, blend together as they flow down the tapered portion 146 into the reflexed neck 148. The reflexed neck 148 communicates with an intermediate arm 150. As best seen in FIGURE 6, the lower portion of the intermediate arm 150 is formed into a substantially rectangular portion 152 through which the light rays are to pass for viewing by the photoelectric device 71. More specifically, the rectangular viewing portion 152 has the opposing end walls 154 and 156, which form the narrower dimension of said viewing portion 152, and the opposing side walls 158 and 160 which form the wider or elongated dimension thereof. As best seen in FIGURE 2, the flow cell is positioned in the holder so that the light rays R2 enter the end wall 156 and are focused within the viewing portion 152, as at focal point 68, from which point they spread and leave the viewing portion through the opposite end wall 154 and travel in a spread beam to the photoelectric device 71, so as not to focus on a single point of the latter and thereby preventing any portion of the latter from being burnt out by a focused point of light. Due to the rectangular cross section of the viewing portion 152, it will be apparent that the light rays R2 travel through a comparatively narrow but elongated body of liquid within the viewing portion 152. This provides a relatively long light path so as to provide increased absorption of the light by the fluid sample and this is accomplished with the utilization of a minimum amount of sample liquid. This feature of the invention is quite important especially in cases where relatively small amounts of the sample liquid are available for analysis, for example and not by way of limitation, in the case of the analysis of a blood sample taken from an infant.

From the rectangular viewing portion 152, the liquid flows through the reflexed neck 162 into the previously mentioned outlet arm 138. Adjacent the upper end thereof, as at 164, the outlet arm 138 is connected to the intermediate tube 150 at an upper open portion 166 thereof, above the viewing portion 152 thereof. Said portion 166 of the intermediate tube 150, serves as a vent for the outlet arm 138 and for the viewing portion, it being noted that the vent 166 extends through the opening 80 in the cover 82 to the outer atmosphere. Consequently, it will be noted that the flow cell 78 is provided with the pair of vents 144 and 166 for the inlet and outlet arms, respectively, thereof. Said vents are interconnected by the tubular portion 168 which constitutes an air equalization means for equalizing the hydrostatic pressures in the various arms of the flow cell 78 to prevent surging of the liquid in the flow cell. An integral reenforcing rib 170 is provided between the input and intermediate arms above the reflexed neck 148.

The lower end of the output arm 138 terminates in a ball or spherical formation 172 which is apertured, as at 174, to permit the flow or discharge of the liquid therefrom. In this connection, it will be noted that the hollow cell holder 70 is provided, at the bottom thereof, with an opening 176 which is in registry with an opening 178 provided in the base 12. A socket receiving member 180, complementary to the ball formation 172, is mounted in the cell aperture 176 and is provided with a tubular portion 182 which extends through the base opening 178 for connection with an exhaust or discharge conduit 184. Consequently, it will be apparent that the sample liquid entering the arm 136, wherein the air segments are released therefrom, are blended in the tapered portion 146 and the reflexed neck 148 through which they flow into the viewing portion 152. The liquid then flows from the viewing portion through the reflexed neck 162 into the outlet arm 138 and through the ball formation 172 of the latter and the socket member 180 into the conduit 184 through which they are discharged from the colorimeter 10.

At the upper end thereof, above the connecting portion 164, the discharge arm 138 is provided with an additional ball or spherical formation 186, the function of which is hereinafter described in detail.

In order to mount a flow cell 78 in the cell holder 70, the flow cell is inserted so that the ball formation 172 is engaged in the complementary socket receiving member 180 to constitute a ball and socket or universal joint. In order to assure the erect or vertical disposition of the flow cell within the cell holder, provision is made in the latter, adjacent the upper end thereof, for a detent element or abutment member 188 at the inner surface thereof. The opposite wall of the cell holder mounts a leaf spring 190 which extends into the interior of the cell holder, in opposition to the abutment member 188. Consequently, it will be apparent that when the flow cell is inserted into the cell holder so that the ball formation 172 is engaged in the complementary socket member 180, the spring 190 engages the intermediate arm 150, above the viewing portion 152 thereof, and urges the latter against the abutment 188 to maintain the flow cell in the original disposition thereof illustrated in FIG. 2.

In order to releasably lock the flow cell in said erected disposition thereof, provision is made for the locking member 192. In order to mount said locking member 192, provision is made for an apertured block 194 suitably secured to the outer surface of the cell holder 70, as by the securing elements 196. A bolt 198 extends through the block 194 having its head 200 at one end of the block, and being provided with a collar 202 at the opposite end of the block, so as to prevent displacement of the bolt 198 longitudinally of the block, without however preventing the rotation of the bolt within the block.

The cap 192 is provided with a pair of spaced legs 204 through which the bolt 198 extends, in threaded relation therewith. A lever 206 is pivoted at one end between the legs 204, as by a pivot element 208 mounted by said legs and extending threbetween. The free end of the lever 206 extends through a pivot opening 210 provided in a bracket 212 mounted at the outer surface of the cell holder 70. A compression spring 214 is mounted on the lever 206, between the bracket 210 and the enlarged lever head 216. It will be understood that the cap and the lever 206 constitute a spring toggle, the knuckle of which is constituted by the pivot 208 and the opposing axes of which are constituted by the bolt 198 and the aperture 210 in the bracket 212. At the free end thereof, the cap 192 is provided with a depending portion 218 having a recess 220 which defines a socket adapted to receive the ball formation 186.

From the foregoing, it will be apparent that the cap 192 may be moved from a retracted position thereof, wherein the cap would be pivoted to the left of the bolt 198, viewing FIG. 4, and the knuckle 208 would be to the right of the line of action between the bolt 198 and the aperture 210, to the position thereof illustrated in FIG. 4, wherein the cap is engaged on the ball portion 186 of the flow cell and retained releasably in said position by the overset spring toggle. The cap can be readily removed from the flow cell by moving it back to the inoperative position thereof wherein the toggle oversets to the right of the line of action thereof, viewing FIGURE 4.

With the cell holder 70 adjusted relative to the light outlet aperture 67, as previously described, it is not necessary to readjust the lateral positioning thereof upon the removal or replacement of a flow cell 78. However, upon such replacement, it may be necessary to accurately adjust the positioning of the flow cell within the cell holder so as to assure that the focal point 68 will be within the rectangular portion 152 as shown in FIGURE 2. In this connection, provision is made for the lateral adjustment of the flow cell 78 across the light path of the beam of light emanating from the outlet aperture 67. This can be readily accomplished by a screwdriver adjustment of the bolt 198, the cap 192 constituting a traveler on the bolt due to the threaded engagement of the bolt and cap and the fact that the bolt is retained against movement longitudinally of the block 194. The adjustment of the flow cell 78, in one plane transversely of the light path, is facilitated by the ball and socket joint mounting of the discharge arm 138 at the sperical end 172 thereof to permit a rotary movement of said spherical end in the socket receiving part 180. This adjustment of the flow cell can be accomplished under the direct view of an observer who has removed the individual cap or cover 82 due to the fact that the passage of the light beam through the center arm 150 can be observed by looking into said arm from the open top thereof.

Figure 8:
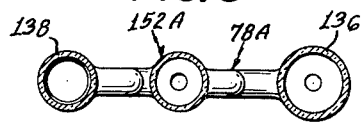
FIG. 8 is a view similar to FIG. 6 and illustrates a modification.
Figure 5:
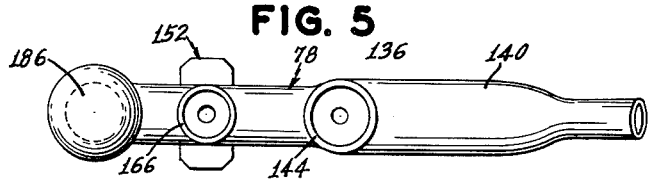
FIG. 5 is a top plan view of the flow cell as seen in the direction of the arrow 5 in FIG. 3.

Referring now to FIG. 8, there is illustrated a modified form of flow cell. As here shown, provision is made for a flow cell 78A which is similar in all respects to the flow cell 78 with the exception that the light viewing or traversing portion 152A thereof is not constituted by a portion having a rectangular cross section but by a portion having a circular cross section. In all other respects, the flow cell 78A is similar to the flow cell 78.

Certain features shown and described herein are claimed in my divisional application, Serial No. 83,509 filed January 18, 1961.

While I have shown and described the preferred embodiments of my invention, it will be understood that various changes may be made in the idea or principles of the invention within the scope of the appended claims.

Having thus described my invention, what I claim and desire to secure by Letters Patent is:

1. A flow cell for exposing a liquid stream to a light beam for viewing by a photosensitive device, comprising a tubular inlet member having an inlet opening for the liquid stream above its lower end and a vent opening, another tubular member laterally spaced from said first mentioned tubular member and having an inlet opening and a light-permeable portion above its lower end to provide a viewing member for exposing the liquid column therein to the light beam, a tubular reflexed part connecting the lower end of said inlet member to said viewing member at said inlet opening thereof to provide a reflexed flow path for the liquid stream from said inlet member to said viewing member, outlet means for the liquid stream connected to said viewing member above its lower end for providing a predetermined level of liquid in said viewing member, and vent means above said outlet means whereby the pressures on the liquids in said outlet means and said inlet member are equal.

2. A flow cell for exposing a liquid stream to a light beam for viewing by a photosensitive device, comprising a tubular inlet member having an inlet opening for the liquid stream above its lower end and a vent opening also above its lower end, an inlet tube connected to said inlet member at said inlet opening thereof and extending laterally therefrom, another tubular member laterally spaced from said first mentioned tubular member and having an inlet opening and a light-permeable portion above its lower end to provide a viewing member for exposing the liquid column therein to the light beam, a tubular reflexed part connecting the lower end of said inlet member to said viewing member at said inlet opening thereof to provide a reflexed flow path for the liquid stream from said inlet member to said viewing member, outlet means for the liquid stream connected to said viewing member above its lower end for providing a predetermined level of liquid in said viewing member, and vent means above said outlet means whereby the pressures on the liquids in said outlet means and said inlet member are equal.

3. A flow cell for exposing a liquid stream to a light beam for viewing by a photosensitive device, comprising a tubular inlet member having an inlet opening for the liquid stream above its lower end and a vent opening above said inlet opening, an inlet tube connected to said inlet member at said inlet opening thereof and extending laterally therefrom, another tubular member laterally spaced from said first mentioned tubular member and having an inlet opening and a light-permeable portion above its lower end to provide a viewing member for exposing the liquid column therein to the light beam, said viewing member having a vent opening above said inlet opening thereof, a tubular reflexed part connecting the lower end of said inlet member to said viewing member at said inlet opening thereof to provide a reflexed flow path for the liquid stream from said inlet member to said viewing member, outlet means for the liquid stream connected to said viewing member above its lower end for providing a predetermined level of liquid in said viewing member, and vent means above said outlet means whereby the pressures on the liquids in said outlet means, said inlet member and said viewing member are equal.

4. A flow cell for exposing a liquid stream to a light beam for viewing by a photosensitive device, comprising a tubular inlet member having an inlet opening for the liquid stream above its lower end and a vent opening above said inlet opening, an inlet tube connected to said inlet member at said inlet opening thereof and extending laterally therefrom, another tubular member laterally spaced from said first mentioned tubular member and having an inlet opening and a light-permeable portion above its lower end to provide a viewing member for exposing the liquid column therein to the light beam, said viewing member having a vent opening above said inlet opening thereof, a tubular reflexed part connecting the lower end of said inlet member to said viewing member at said inlet opening thereof to provide a reflexed flow path for the liquid stream from said inlet member to said viewing member, outlet means for the liquid stream connected to said viewing member above its lower end for providing a predetermined level of liquid in said viewing member, and vent means above said outlet means whereby the pressures on the liquids in said outlet means, said inlet member and said viewing member are equal, said light-permeable portion being of elongated rectangular cross section to form an elongated path for the light beam therethrough to provide for increased light absorption with a minimum quantity of liquid therein.

5. A flow cell for exposing a liquid stream to a light beam for viewing by a photosensitive device, comprising a tubular inlet member having an inlet opening for the liquid stream above its lower end, another tubular member laterally spaced from said first mentioned tubular member and having an inlet opening and a light-permeable portion above its lower end to provide a viewing member for exposing the liquid column therein to the light beam, a tubular reflexed part connecting the lower end of said inlet member to said viewing member at said inlet opening thereof to provide a reflexed flow path for the liquid stream from said inlet member to said viewing member, and outlet means for the liquid stream connected to said viewing member above its lower end for providing a predetermined level of liquid in said viewing member, said outlet means comprising a tube laterally spaced from said viewing member and having an inlet opening above said lower end of said viewing member, tubular means connecting said lower end of said viewing member to said inlet opening of said tube to provide a flow path for the liquid from said viewing member to said tube, said tube having an opening at the lower end thereof below its inlet opening for discharging the liquid from said flow cell and having an opening above its inlet opening for venting said tube.

6. In a colorimeter, a flow cell and a holder therefor, said holder having opposing walls, each having a light transmitting portion defined therein, said portions being in registry for the passage of light therethrough, said flow cell being provided with a liquid receiving part having a light-permeable portion, means for mounting said flow cell removably in said holder comprising vertically spaced spherical socket parts on said holder and complimentary vertically spaced ball parts on said flow cell engageable in said spherical socket parts, respectively, and a traveler mounted by said holder and including one of said socket parts engaged with said flow cell at one of said ball parts, and means to adjustably move said traveler transversely of said light path to pivot said flow cell at said ball parts transversely of said light path to dispose said light-permeable portion in said light path.

7. A flow cell for a colorimeter or the like, said flow cell having a liquid inlet part, a light-permeable liquid receiving part in liquid flow communication with said inlet part, an outlet part, and a part extending upwardly from said receiving part to said outlet part to predetermine the liquid level in said receiving part, said outlet part being provided at the liquid discharge end thereof with one part of a ball joint assembly and at the other end thereof with one part of another ball joint assembly for permitting the lateral adjustment of the flow cell across the path of a beam of light.

8. A flow cell for a colorimeter or the like, comprising a liquid inlet part, a light-permeable liquid receiving part in liquid flow communication with said inlet part, a vertically extending outlet part, and a part extending upwardly from said receiving part to said outlet part and in liquid flow comunication therewith to predetermine the liquid level in said receiving part, said outlet part being provided at each end thereof with parts of a universal joint assembly adapted to be engaged in complementary parts of a universal joint assembly mounted in a holder for said flow cell to permit the lateral adjustment of said flow cell across the path of a beam of light, said light-permeable liquid receiving part being shaped to elongate the light path therethrough to provide for increased light absorption with a minimum quantity of liquid therein.

9. A flow cell for a colorimeter or the like, comprising a liquid inlet part, a light-permeable liquid receiving part in liquid flow communication with said inlet part, a vertically extending outlet part, and a part extending upwardly from said receiving part to said outlet part and in liquid flow communication therewith to predetermine the liquid level in said receiving part, said outlet part being provided at each end thereof with parts of a universal joint assembly adapted to be engaged in complementary parts of a universal joint assembly mounted in a holder for said flow cell to permit the lateral adjustment of said flow cell across the path of a beam of light, said light-permeable liquid receiving part being of elongated rectangular cross-section to form an elongated light path therethrough to provide for increased light absorption with a minimum quantity of liquid therein.

10. A flow cell for a colorimeter or the like, comprising a liquid inlet part, a light-permeable liquid receiving part, a reflexed part connecting said liquid inlet part to said liquid receiving part and in fluid communication therewith for blending liquid segments flowing from said liquid inlet part, a vertically extending outlet part, and a part extending upwardly from said receiving part to said outlet part and in liquid flow communication therewith to predetermine the liquid level in said receiving part, said outlet part being provided at each end thereof with parts of a universal joint assembly adapted to be engaged in complementary parts of a universal joint assembly mounted in a holder for said flow cell to permit the lateral adjustment of said flow cell across the path of a beam of light, said light-permeable liquid receiving part being shaped to elongate the light path therethrough to provide for increased light absorption with a minimum quantity of liquid therein.

11. In a colorimeter, a flow cell and a holder therefor, said holder having opposing walls, each of said walls having a light transmitting portion defined therein, said portions being in registry for the passage of light therethrough, said flow cell being provided with a liquid receiving part having a light-permeable portion, means for mounting said flow cell removably in said holder comprising vertically spaced spherical socket parts on said holder and complementary vertically spaced ball parts on said flow cell engageable in said spherical socket parts, respectively, and means to adjustably move one of said spherical socket parts transversely of said light path to pivot said flow cell at said ball parts transversely of said light path to dispose said light-permeable portion in said light path.

12. In a colorimeter, a flow cell and a holder therefor, said holder having opposing walls, each of said walls having a light transmitting portion defined therein, said portions being in registry for the passage of light therethrough, said flow cell being provided with a liquid receiving part having a light-permeable portion, means for mounting said flow cell removably in said holder comprising vertically spaced spherical socket parts on said holder and complementary vertically spaced ball parts on said flow cell engageable in said spherical socket parts, respectively, and means to adjustably move one of said spherical socket parts transversely of said light path to pivot said flow cell at said ball parts transversely of said light path to dispose said light-permeable portion in said light path, said last mentioned means comprising a traveler mounted on said holder and including one of said socket parts, and means for adjustably positioning said traveler transversely of said light path.

13. In a colorimeter, a flow cell and a holder therefor, said holder having opposing walls, each of said walls having a light transmitting portion defined therein, said portions being in registry for the passage of light therethrough, said flow cell being provided with a liquid receiving part having a light-permeable portion, means for mounting said flow cell removably in said holder comprising vertically spaced spherical socket parts on said holder and complementary vertically spaced ball parts on said flow cell engageable in said spherical socket parts, respectively, and means to adjustably move one of said spherical socket parts transversely of said light path to pivot said flow cell at said ball parts transversely of said light path to dispose said light-permeable portion in said light path, said light-permeable part being shaped to elongate the light path therethrough to provide increased light absorption with a minimum quantity of liquid therein.

14. In a colorimeter, a flow cell and a holder therefor, said holder having opposing walls, each of said walls having a light transmitting portion defined therein, said portions being in registry for the passage of light therethrough, said flow cell being provided with a liquid receiving part having a light-permeable portion, means for mounting said flow cell removably in said holder comprising vertically spaced spherical socket parts on said holder and complementary vertically spaced ball parts on said flow cell engageable in said spherical socket parts, respectively, and means for permitting vertical alignment of said flow cell in said holder comprising complementary members on said holder engageable by locating parts on said flow cell in the mounted condition thereof in said holder.

References Cited in the file of this patent

UNITED STATES PATENTS

| | | |
|---|---|---|
| 1,504,770 | Lieber | Aug. 12, 1924 |
| 1,900,893 | Hickman | Mar. 7, 1933 |
| 2,051,317 | Sheard et al. | Aug. 18, 1936 |
| 2,197,190 | Mott-Smith | Apr. 16, 1940 |
| 2,232,169 | Diller | Feb. 18, 1941 |
| 2,328,461 | Kienle et al. | Aug. 31, 1943 |
| 2,490,345 | Flatford et al. | Dec. 6, 1949 |
| 2,496,333 | Cary et al. | Feb. 7, 1950 |
| 2,594,113 | Askin | Apr. 22, 1952 |
| 2,630,735 | Rouy | Mar. 10, 1953 |
| 2,649,011 | Black | Aug. 18, 1953 |
| 2,677,987 | Gallasch | May 11, 1954 |
| 2,682,801 | Davidson et al. | July 6, 1954 |
| 2,797,149 | Skeggs | June 25, 1957 |

FOREIGN PATENTS

| | | |
|---|---|---|
| 837,918 | France | Nov. 28, 1938 |
| 883,335 | France | Mar. 22, 1943 |
| 724,121 | Germany | Aug. 19, 1942 |